US008832847B2

(12) United States Patent
Anand et al.

(10) Patent No.: US 8,832,847 B2
(45) Date of Patent: Sep. 9, 2014

(54) COORDINATING DATA SHARING AMONG APPLICATIONS IN MOBILE DEVICES

(75) Inventors: Rangachari Anand, Teaneck, NJ (US); Stacy F. Hobson, Poughkeepsie, NY (US); Juhnyoung Lee, Yorktown Heights, NY (US); Yuan Wang, Liaoning (CN); Jing Min Xu, Beijing (CN); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/545,416

(22) Filed: Jul. 10, 2012

(65) Prior Publication Data

US 2014/0018048 A1    Jan. 16, 2014

(51) Int. Cl.
G06F 7/04      (2006.01)
G06F 17/30     (2006.01)
H04N 7/16      (2011.01)
G06F 21/62     (2013.01)
G06F 21/00     (2013.01)

(52) U.S. Cl.
CPC ............ *G06F 21/6218* (2013.01); *G06F 21/00* (2013.01); *G06F 2221/2145* (2013.01)
USPC .......................................................... 726/26

(58) Field of Classification Search
CPC ......... G06F 21/50; G06F 21/52; G06F 9/468; G06F 2221/2145
USPC .............................. 455/414.1; 726/22, 24–25
See application file for complete search history.

(56) References Cited

U.S. PATENT DOCUMENTS

| 5,631,907 | A | 5/1997 | Guarneri et al. |
| 6,009,525 | A | 12/1999 | Horstmann |
| 6,134,593 | A | 10/2000 | Alexander et al. |
| 6,167,568 | A | 12/2000 | Gandel et al. |
| 6,385,596 | B1 | 5/2002 | Wiser et al. |
| 6,449,308 | B1 | 9/2002 | Knight, Jr. et al. |
| 6,463,466 | B1 | 10/2002 | Weyer |
| 6,564,325 | B1* | 5/2003 | Travostino et al. ............. 726/21 |
| 7,054,834 | B2 | 5/2006 | Hatakeyama |
| 7,260,598 | B1 | 8/2007 | Liskov et al. |
| 8,434,157 | B1* | 4/2013 | Wang et al. ..................... 726/29 |
| 2001/0023412 | A1 | 9/2001 | Morimoto |
| 2002/0073312 | A1 | 6/2002 | Adiano et al. |
| 2003/0126275 | A1 | 7/2003 | Mungavan et al. |
| 2005/0027616 | A1 | 2/2005 | Jones et al. |
| 2005/0027846 | A1 | 2/2005 | Wolfe et al. |
| 2005/0097567 | A1* | 5/2005 | Monnie et al. ................ 719/315 |

(Continued)

OTHER PUBLICATIONS

Inter Process Communication in Android Sarath Singpati Mar. 7, 2012.*

(Continued)

*Primary Examiner* — Christopher Revak
*Assistant Examiner* — Vadim Savenkov
(74) *Attorney, Agent, or Firm* — Scully, Scott, Murphy & Presser, P.C.; Louis J. Percello, Esq.

(57) ABSTRACT

Coordinating data sharing among applications in mobile devices, in one aspect, may include a shared data manager application on a mobile device that manages data trade requirements of a plurality of mobile applications, and permission grants or denials to reads and writes of data managed by the shared data manager and used by the plurality of mobile applications.

17 Claims, 4 Drawing Sheets

(56) References Cited

U.S. PATENT DOCUMENTS

| | | |
|---|---|---|
| 2006/0064488 A1 | 3/2006 | Ebert |
| 2006/0195777 A1 | 8/2006 | Davis et al. |
| 2006/0282390 A1 | 12/2006 | Gupte |
| 2007/0143212 A1 | 6/2007 | Smith et al. |
| 2008/0033882 A1 | 2/2008 | Kafkarkou et al. |
| 2008/0040420 A1 | 2/2008 | Twiss et al. |
| 2008/0082551 A1 | 4/2008 | Farber et al. |
| 2008/0091658 A1 | 4/2008 | Kremen |
| 2008/0097921 A1 | 4/2008 | Kim et al. |
| 2008/0228869 A1 | 9/2008 | Kraft et al. |
| 2008/0275784 A1 | 11/2008 | Kramer et al. |
| 2009/0031367 A1 | 1/2009 | Sue |
| 2009/0055547 A1 | 2/2009 | Hudson et al. |
| 2009/0157899 A1 | 6/2009 | Gagliardi et al. |
| 2009/0276332 A1 | 11/2009 | Gharabally et al. |
| 2009/0276333 A1 | 11/2009 | Cortes et al. |
| 2009/0307105 A1 | 12/2009 | Lemay et al. |
| 2010/0235430 A1 | 9/2010 | Kim |
| 2010/0250946 A1 | 9/2010 | Korte et al. |
| 2010/0281475 A1 | 11/2010 | Jain et al. |
| 2010/0299219 A1 | 11/2010 | Cortes et al. |
| 2011/0010759 A1 | 1/2011 | Adler |
| 2011/0055355 A1 | 3/2011 | Lee et al. |
| 2011/0106916 A1 | 5/2011 | Cho et al. |
| 2011/0161461 A1 | 6/2011 | Niven-Jenkins et al. |
| 2012/0084791 A1* | 4/2012 | Benedek et al. ............... 719/313 |
| 2012/0110174 A1* | 5/2012 | Wootton et al. ................ 709/224 |
| 2012/0117504 A1 | 5/2012 | Lemay et al. |
| 2012/0291102 A1* | 11/2012 | Cohen ................................ 726/4 |
| 2012/0317609 A1* | 12/2012 | Carrara et al. ..................... 726/1 |
| 2013/0052992 A1* | 2/2013 | Lee et al. ....................... 455/411 |

OTHER PUBLICATIONS

On Lightweight Mobile Phone Application Certification William Enck, Machigar Ongtang, and Patrick McDaniel CCS'09, Nov. 9-13, 2009, Chicago, Illinois, USA.*

Analyzing Inter-Application Communication in Android Erika Chin Adrienne Porter Felt Kate Greenwood David Wagner 2011.*

Ha, Sprechen Sie Google? A New Web Translator, Time Magazine, Thursday, May. 6, 2010, http://www.time.com/time/magazine/article/0,9171,1987587,00.html.

* cited by examiner

COORDINATING DATA SHARING AMONG APPLICATIONS IN MOBILE DEVICES

FIELD

The present application relates generally to computers, and computer applications, and more particularly to mobile devices such as smart phones, mobile networking and mobile applications.

BACKGROUND

Existing mobile device applications or apps, for instance, applications for smartphones, are restricted in their capability to communicate with other applications on the same mobile device because they run in a sandbox paradigm. For example, for security reasons, a mobile device's operating system (OS) may restrict each application (including its preferences and data) to a unique location in the file system. This restriction is part of the security feature known as the application's sandbox. The sandbox is a set of fine-grained controls limiting an application's access to files, preferences, network resources, hardware, and so on. Each application has access to the contents of its own sandbox but cannot access other applications' sandboxes.

In another known mobile device, the kernel sandboxes applications from each other, and therefore, applications must explicitly share resources and data. They do this by declaring the permissions they need for additional capabilities not provided by the basic sandbox. Applications statically declare the permissions they require, and the system prompts the user for consent at the time the application is installed. There is no mechanism for granting permissions dynamically (at runtime) because it complicates the user experience to the detriment of security.

The current smartphone data access model allows and application to access or read only its own private data and those carefully selected data objects maintained by the system, for example, the mobile device's operating system that may include content management functionality. Applications cannot directly communicate with each other.

BRIEF SUMMARY

A method and system for coordinating data sharing among applications is provided. The method, in one aspect, may include creating on a mobile device one or more shared data manager partitions. The method may also include receiving from a plurality of mobile applications deployed on the mobile device, data trade requirements associated with the plurality of mobile applications, data trade requirements including requirements to read, or write or both read and write, of data managed by the one or more shared data manager partitions. The method may further include receiving grants or denials of the requirements for each of the plurality of mobile applications. The method may also include storing the grants or denials in a shared data manager operational database. The method may further include transmitting the grants or denials to the plurality of mobile applications. The plurality of mobile applications may be enabled to execute their functionalities using the data based on said grants or denials.

A system coordinating data sharing among applications in mobile devices, in one aspect, may include a mobile device having a processor. A shared data manager application may be deployed on the mobile device, the shared data manager including one or more shared data manager partitions. A plurality of mobile applications may be deployed on the mobile device, each of the plurality of mobile applications providing data trade requirements associated with the each of the plurality of mobile applications, data trade requirements including requirements to read, or write or both read and write, of data managed by the one or more shared data manager partitions. The shared data manager may receive grants or denials of the requirements for each of the plurality of mobile applications, the shared data manager further storing the grants or denials in a shared data manager operational database, and transmitting the grants or denials to the plurality of mobile applications. The plurality of mobile applications may be enabled to execute their functionalities using the data based on said grants or denials.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A controlled mechanism is provided for applications (also referred to as apps) on smart mobile devices to communicate with each other. In one aspect, mobile users are enabled to coordinate access to data shared among different applications. In another aspect, instead of each application being self-contained, an application may only need to provide a part of the overall desired functionality, which provides customizability and flexibility for the mobile users.

Figure 1:
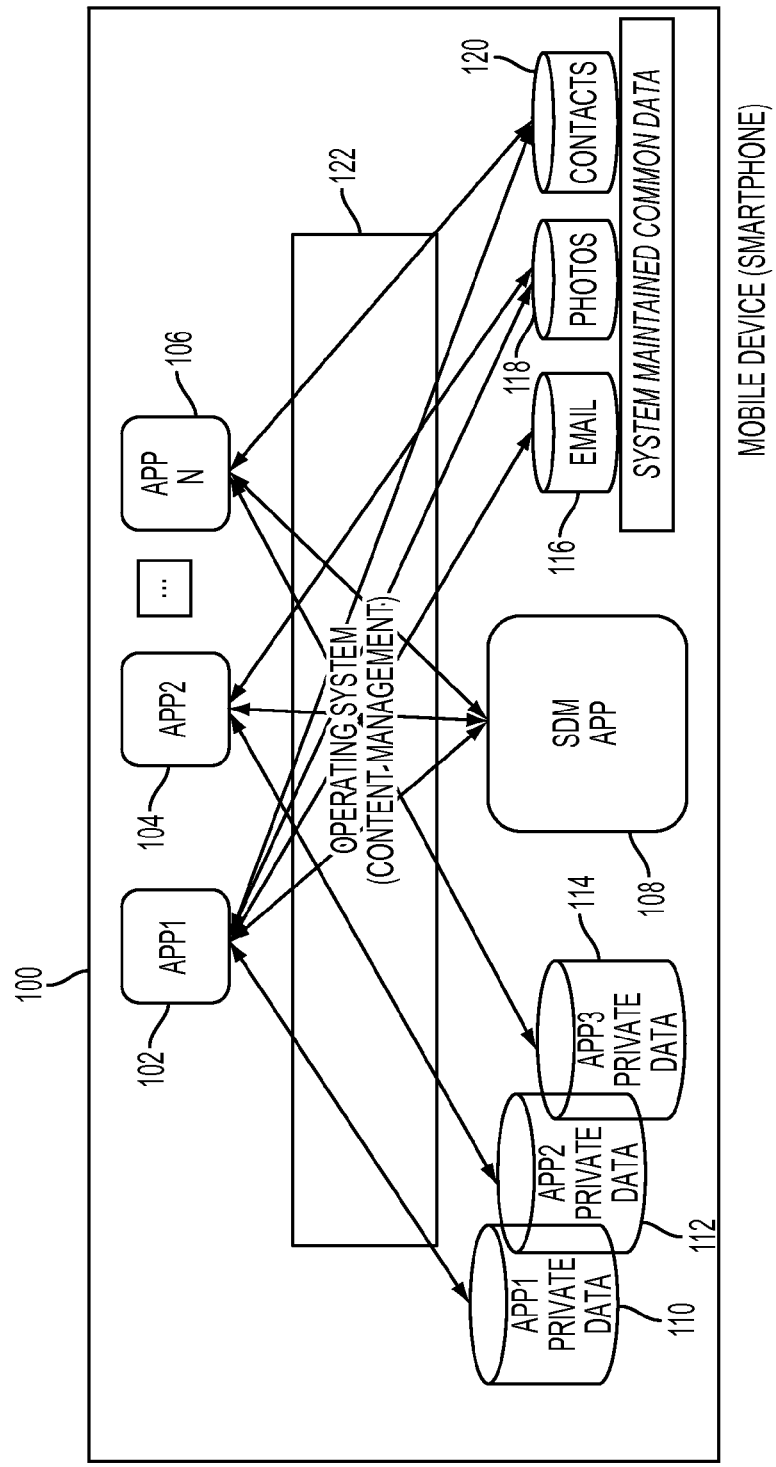
FIG. 1 is a diagram illustrating components of the present disclosure which may be deployed on a mobile device for enabling sharing of data among applications on the mobile device in one embodiment of the present disclosure.

FIG. 1 is a diagram illustrating components of the present disclosure which may be deployed on a mobile device for enabling sharing of data among applications on the mobile device in one embodiment of the present disclosure. A mobile device 100 may include a plurality of applications 102, 104, 106, each having its own data or database 110, 112, 114 respectively, for performing its functions. An operating system 122 provides system functionalities for the mobile device 100. The mobile device 100 may also include system maintained common data associated with functionalities such as email 116, camera/photo 118, contacts 120, and others. Usually, while system maintained common data, e.g., 116, 118, 120, may be accessible to the applications 102, 104, 106, an application may not access data maintained by another application. In the system and methodology of the present disclosure, applications 102, 104, 106 are enabled with a controlled way of communicating with each other via a shared data manager (SDM) 108. In one embodiment of the present disclosure, instead of each application being self-contained, an application only needs to provide a part of the overall desired functionality, which allows for much more customizability for users. The SDM 108 may be implemented as an application that can be downloaded from an electronic application store or the like (such as an app store), and configured to work with other applications in the device 100. An editor or like functionality, referred to herein as a shared data editor (SDE) can be used to specify permissions for data sharing among applications.

The SDM 108 allows the applications 102, 104, 106 deployed or running on mobile devices to share their data 110, 112, 114 with one another. For example, each mobile application (e.g., 102, 104, 106) may have its own data or database (110, 112, 114, respectively) for use in performing its functionality. In the present application in one embodiment, those applications 102, 104, 106 may access (read and/or write) the data of another application (e.g., 110, 112, 114) via the SDM 108. The SDM itself is a special kind of app which is permitted to communicate with other apps via message passing. The data sharing mechanism among mobile applications of the present disclosure may be used in vertical markets, for example, in the field of medicine, shopping, real estate, public safety, building/facilities maintenance, and others. Platform vendors or the like parties may provide the platform where applications will work together by using SDM. These may be generic application (app) stores that offer applications in various domains. There may be a separate app store for a different domain. For example, an app store for medicine, another one for real estate, yet another one for public safety, and others may exist. There may be one platform vendor that provides the platform services across the different app stores, while there are different platform vendors for different platforms in different app stores in different domains. Such platform vendors, e.g., may define schema, for example, for a domain, and application programmers or the like may write applications that take advantage of the data sharing mechanism via the defined schema. A different schema for each domain may be created, e.g., to keep it compact and easy to understand. For sharing data across domains, it is possible to create meta-data schema for mapping data model/schema from a domain to that in another domain.

In one embodiment of the present disclosure, the SDM data schema is open and may be shared among the application developers. When an application programmer or the like develops the applications, the programmer or the like may refer to the data schema and define the app-specific local data schema based on the SDM data schema. It is also possible that the local schema (local to the application) is not strictly based on the SDM data schema. In that case, during the app's onboarding to the SDM platform, the SDM administrator may create a mapping between the SDM data schema and app's local data schema. It is possible that there may not be a full mapping between them. The SDM in one embodiment allows apps to share whatever is mapped to the SDM data schema. In one aspect, the SDM is based on loose coupling of applications on a best effort basis. The SDM may also include an editor, referred to as a shared data editor (SDE). Given a large app store, SDE in one embodiment of the present disclosure may automatically recommend apps and their "data trades" based on needs and constraints.

Details of SDM are further described in co-owned U.S. patent application Ser. No. 13/051,303 entitled, "Shared Data Management in Software-As-A-Service Platform" and filed on Mar. 18, 2011, which application is incorporated herein by reference in its entirety. That application discloses a shared data manager (SDM) concept on Software as a Service (SaaS) cloud computing platform that enables loose coupling of SaaS applications. Applications can share data without being directly aware of each other. SDM on SaaS provides a curated data model, in which platform vendors can define object schema and write applications that access data, offering fine-grained permission control over access to shared data. Co-owned U.S. patent application Ser. No. 13/163,274 entitled, "Open Data Marketplace for Municipal Services" and filed on Jun. 17, 2011 describes data marketplace; co-owned U.S. patent application Ser. No. 13/163,177 entitled, "Dynamic Application Adaptation in Software-As-A-Service Platform" and filed on Jun. 17, 2011 describes dynamic application adaptation; co-owned U.S. patent application Ser. No. 13/163,373 entitled, "Enforcing Data Sharing Policy Through Shared Data Management" and filed on Jun. 17, 2011, describes enforcing data sharing. Those applications are incorporated herein by reference in their entirety.

Figure 2:
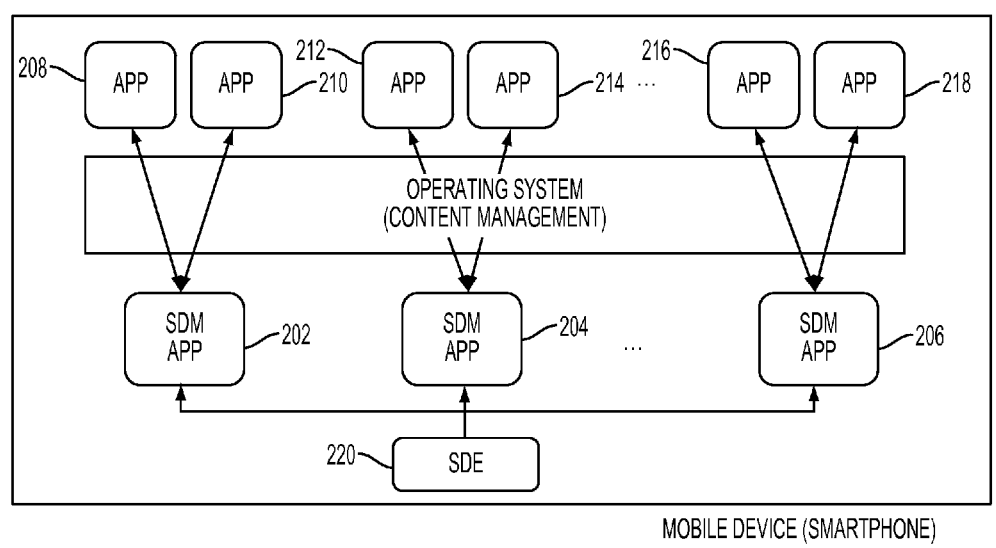
FIG. 2 is a diagram illustrating multiple logical SDMs on a single device in one embodiment of the present disclosure.

FIG. 2 is a diagram illustrating multiple logical SDMs on a single device in one embodiment of the present disclosure. In this embodiment, multiple SDMs 202, 204, 206 may be provided, e.g., each having its own logical partition. For example, a mobile device owner may be engaged in multiple domains. For instance, the example mobile device owner may be a medical doctor and a history buff who happens to look for a new house to move in. The example mobile device owner may run a few medical related apps to work as a doctor. The example mobile device owner may also run a few apps associated with the hobby as a history buff. The example mobile device owner may also run a few apps related to real estate. Thus, there may exist SDM instance associated with each of the domains (e.g., medical field, field of history, real estate field). One physical SDM app may exist on the mobile devices with multiple different SDM app instances associated with each of the domains. Each SDM instance may have a different data schema to deal with a different set of apps in the corresponding domain. In another embodiment, there can be a single SDM app instance that supports multiple data schema, one for each domain. In both embodiments, there may be only a single physical object database supporting multiple logical data schema, one for each domain. Each SDM may be shared by a cluster of applications. For example, applications 208, 210 may share data via the SDM 202; applications 212, 214 may share data via the SDM 204; applications 216, 218 may share data via the SDM 204. Each cluster of application, for instance, may be in a common domain. In one embodiment of the present disclosure, the logical SDMs 202, 204, 206 may be kept in separate security partitions to prevent contamination, i.e., data sharing across the logical SDMs. In one embodiment of the application, an application may only communicate with one logical SDM on a mobile device. As described above, there may be only a single database running in a mobile device. This physical database can support multiple logical data schema, one for each domain supporting multiple applications in the domain. In an embodiment, each data schema contains one or more classes modeling one or more objects used (read/written) by the applications in the domain in one or more object databases. There may be a single SDM instance that handles multiple data schema. Also, there may be multiple SDM instances that handle one or more data schema.

Existing operating systems may provide certain content management capabilities which share content from a special set of system-maintained applications such as email, calendar, photo app, etc. In this case, the apps do not directly communicate with each other, but through the operating system. SDM of the present disclosure in one aspect allows configuration for data sharing among apps.

An editor, SDE 220 enables a user or an application programmer or the like to view the data managed by an SDM, or multiple SDMs 202, 204, 206, and enables a user to define which data can be shared, e.g., read or written, by others. For instance, an SDE 220 may include a user interface that presents the data managed by an SDM (e.g., 202) and the applications 208, 210 associated with the SDM 202. The user may define which applications may access which data (e.g., read or write). The SDM collects data trades among apps in its operational database and makes this information available to the user through a tool called the Shared Data Editor (SDE). This tool may be used to decide the actual permissions to be granted to applications. Applications are sent permission messages by the SDM whenever permissions are changed—which could be at any time, i.e., dynamic.

Figure 3:
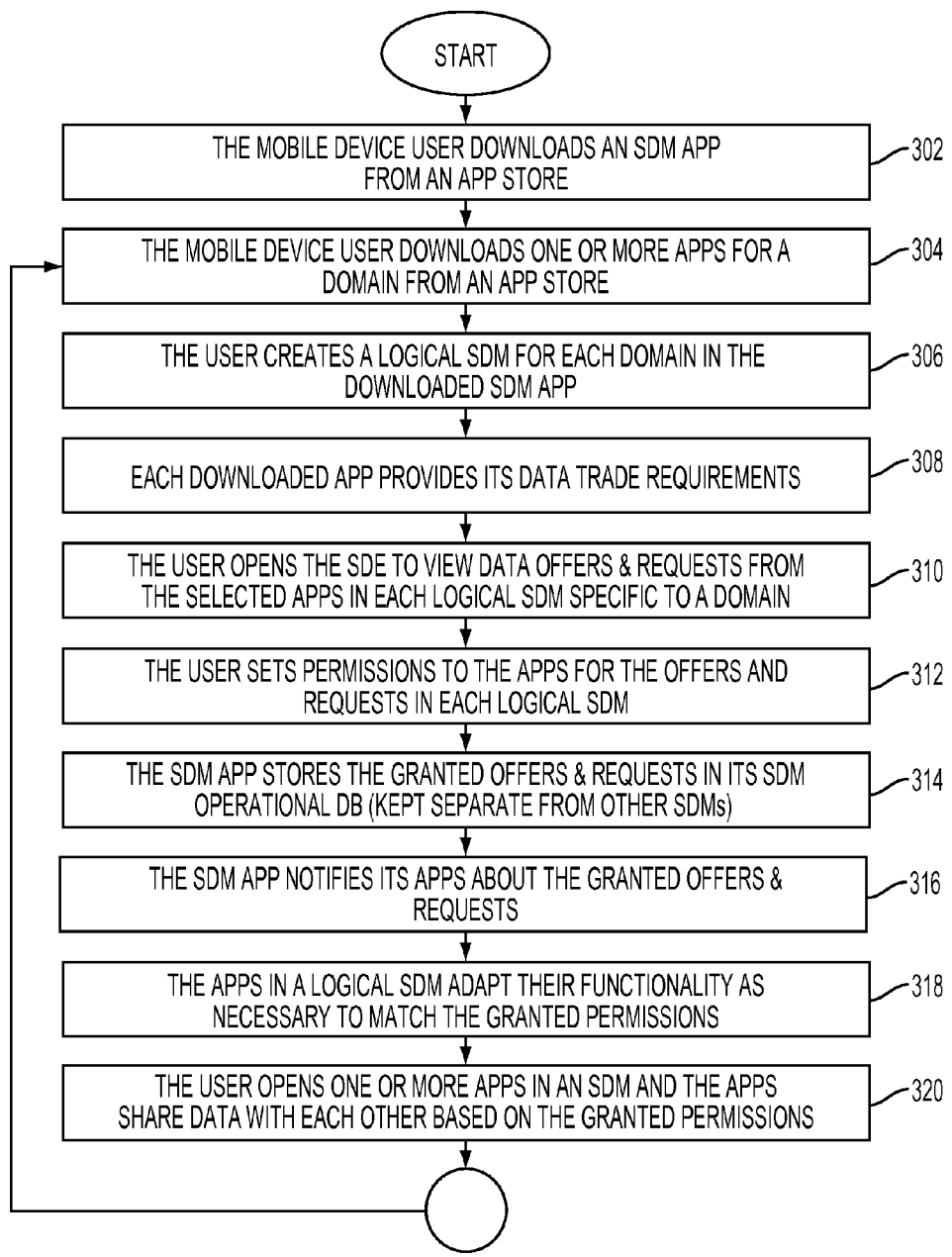
FIG. 3 is a flow diagram illustrating a method in one embodiment of the present disclosure for data sharing among applications in a mobile device.

FIG. 3 is a flow diagram illustrating a method in one embodiment of the present disclosure for data sharing among applications in a mobile device. At 302, an SDM application may be downloaded to a mobile device. For instance, a user of the mobile device may purchase the SDM application via an application store accessible on the mobile device. At 304, one or more applications may be downloaded to the mobile device. For example, as in the SDM application, the user of the mobile device may purchase the one or more application from an application store accessible on the mobile device. At 306, one or more logical SDMs may be created. In an embodiment that includes multiple logical SDMs, multiple logical SDMs may be created, for example, one per domain or field. In one embodiment of the present disclosure, whenever a user adds a new domain to the SDM app, the app creates a logical SDM. As part of the domain creation, the user may select apps for the domain. The SDM app collects data trade among the selected apps in the domain, makes the data trade information available to the user through an editor tool, e.g., the SDE. This data trade information for a domain is the data schema for the domain. The user may further configure data sharing permission among the apps via the SDE or the like tool.

At 308, each downloaded application provides its data trade requirements. Data trade in the present disclosure refers to read and write of data, for instance, those which are owned and used by the application as well as other applications. In the present disclosure data write is also referred to as a data offer, data read is also referred to as a data request. Data trade requirements define which data an application would be reading and/or writing. When a new app is downloaded (and assigned to an SDM domain/instance), the SDM app analyzes the data objects used by this app, and maps each of the attributes to one or more attributes in the SDM data schema of the instance. If necessary, the domain's data model, i.e., object model can be extended to accommodate the objects and attributes from this new app. The result of the mapping may shown in the SDE tool or the like. With this view, the user can configure the sharing of the object attributes for this app in the SDE or the like tool. An SDE may be a graphical editor tool that enables a user to view and edit visually, e.g., by drag and drop graphical user interface mechanisms or other mechanisms.

At 310, a user is enabled to, and for example, opens the SDE to view data offers and requests from selected applications in each logical SDM, for example, specific to a domain.

At 312, a user (e.g., the mobile device owner) is enabled to set, and for example, grants or denies permission to the selected applications for the offers and requests.

At 314, the SDM application stores the granted or denied offers and requests in its SDM operational database (DB), which for instance, may be kept separate from other SDMs. In one embodiment of the present disclosure, the SDM operational DB stores metadata, e.g., that describes or specifies, which app can access which attributes in the SDM data schema in the domain. The SDM itself contains the data (as opposed to the metadata), i.e., object attribute values accessed by the apps which have permission.

At 316, the SDM application notifies its applications informing them of the granted offers and requests. When an app is downloaded to a mobile device and the user desires to assign the app to a domain in SDM, the app is linked to the SDM app. The SDM app becomes aware of the app. The app is assigned to an SDM domain. The SDM app analyzes the data trades of the app and reflect it to SDE. Those apps that the SDM recognizes are notified when their permission data change.

At 318, the applications adapt their functionality as necessary to match the granted permissions. In one aspect, the SDM provides a marketplace among apps where they trade data among themselves. For example, consider an object attribute X in an SDM domain where app A, app B and app C are assigned to. Consider that app A and app B write to X, and app C reads X. Also consider that the user sets the permission accordingly in SDE; and the user sets the permission for app C to read the value of X written by app A, but not one by app B. With this setup in SDE, app C acts accordingly. It reads the value of X written by app A, but one by app B. This may lead to different behavior of app C.

At 320, the user opens one or more applications associated with the SDM, and the applications share data with each other based on the granted permissions. For example, the user runs a first application associated with the SDM application and that application may access data that is owned or used by a second application associated with the SDM.

Figure 4:
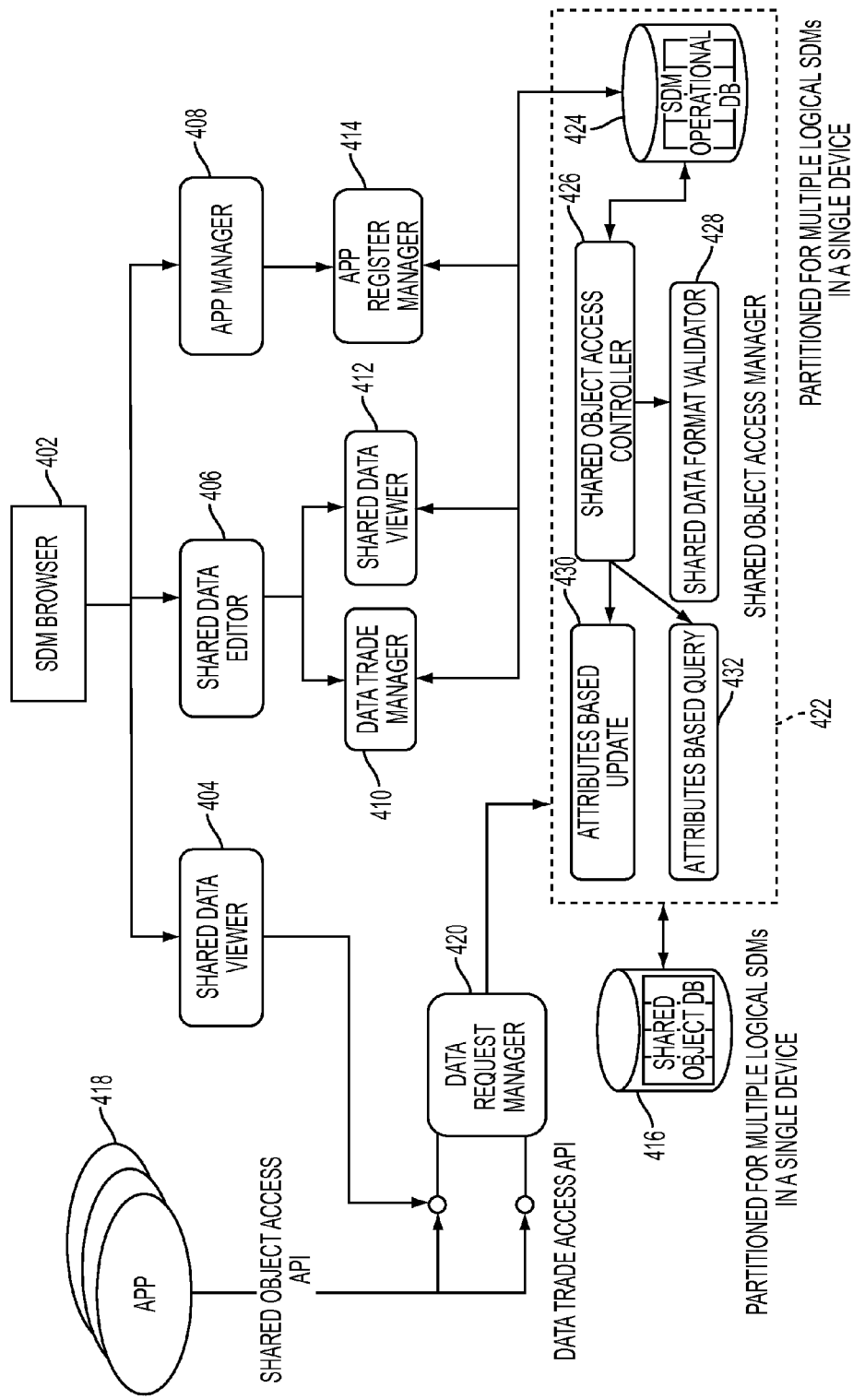
FIG. 4 is a diagram illustrating an SDM and application subscription in a mobile device in one embodiment of the present disclosure.

FIG. 4 is a diagram illustrating an SDM for application subscription in a mobile device in one embodiment of the present disclosure. The components shown are deployed on a mobile device in one embodiment of the present disclosure. The architecture may comprise three layers of components: The components in the first layer may comprise the network-based tools, e.g., web-based tools that are used by the SDM user or the app developers. The SDM user uses a resource management tool (Resource Management Tool) or the like tool to create or update the schema of shared objects. Also, the SDM user may use the tool to query or modify the shared data objects. The SDM user can also use the tool to grant or reject trade requests. The app developers can use a trade management tool (Trade Management Tool) to submit trade requests or view the result of the trade request processing. The SDM user and app developers may use an application management tool (Application Management Tool) to subscribe to or to register, respectively, one or more applications to the SDM. A functionality referred to as a Shared Data Viewer may provide a consolidated view of the shared data to end users, for example, show a parcel data on a geographical map (e.g., graphically via a mapping system or functionality). The components in the second layer may handle the calls coming from the upper level. These components may implement the business logic and access to the operational data. The lowest level may comprise a functionality referred to as a Shared Object Access Manager that acts as the endpoint of shared objects read/write operations. This component may compose shared objects with the right content based on the trade permissions. Also, it may validate the format of incoming and out-going data. The components in the lowest level in one embodiment of the present disclosure are designed to be replaceable to adapt to the different storage system.

An SDM browser 402 may be a user interface that provides interfaces into a shared data viewer 404, a shared data editor 406 and an application manager 408. For instance, when a user selects and runs an SDM application on a mobile device, the user may be presented with the SDM browser 402 that presents the shared data viewer 404, the shared data editor 406 and the application manager 408, from which the user may choose to run. The shared data viewer 404 provides a consolidated view of the shared data to end users, for example, shows the parcel data on a geographical map.

The shared data editor 406 enables a user to grant or deny data offers and requests via a data trade manager 410 and a shared data viewer 412. The app developers can use functionality such as the Trade Management Tool to submit trade requests or view the result of the trade request processing. The Shared Data Viewer provides a consolidated view of the shared data to end users, for example, shows the parcel data on a geographical map (e.g., Google map or ESRI system).

The shared data editor 406 enables a user to grant or deny data offers and requests via a data trade handler 410. The data trade handler 410 may also automatically grant or deny data offers and requests based on analysis performed by an app recommender 412. Those components may provide the functionalities of the Trade Management Tool, via which application developers may submit trade requests or view the result of the trade request processing.

The application manager 408 is a component of the application management tool, which the SDM user and app developers may use to subscribe to or register, respectively, applications to the SDM. An application register manager 414 enables the SDM users and/or application developers to register applications to the SDM.

Applications 418 are those apps that are deployed on the mobile device. The Apps 418 may access an SDM object DB 416 and an SDM operational DB 424 by using application program interfaces (APIs). For example, a Shared Object Access API or the like may be used for accessing the SDM object DB 416 and a Data Trade Access API or the like may be used for accessing the SDM operational DB 424.

A data request manager 420 receives data requests from apps and passes them to the SDM object DB and SDM operational DB for processing.

A shared object database 416 may be at a lowest level of the system architecture and may contain a shared object access manager (Shared Object Access Manager) 422 or the like functionality that acts as the endpoint of shared objects read/write operations. This component composes shared objects with the right content based on the trade permissions. Also, it validates the format of incoming and out-going data. The components in the lowest level are designed to be replaceable to adapt to the different storage system.

Components shown at 422 may reside in local or remote device from the mobile device. For example, all the data both in SDM object DB 416 and SDM operational DB 424 can be stored locally and remotely, e.g., "on cloud" if desired or needed.

The data objects may be categorized into two groups in one embodiment of the present disclosure, an operational data 424 (Operational Data 424) and shared object 416 (Shared Objects). The Operational Data 424 is the metadata of the SDM, including the definition of applications, the shard object schema, various attributes, the data trade of an application, etc. The Shard Objects 416 present the actual data entities, for example, the data structure of a land parcel. It is noteworthy that the number of the Shared Objects and their attributes may increase in time, as more applications are added to the platform.

Shared Object Access Manager 422 works as follows in one embodiment of the present disclosure: An app 418 makes a data query call to the SDM Request Manager 420, which parses the request parameter and performs basic authentication. Then the SDM Request Manager 420 may call a query attributes based query 432 for execution. The attributes based query 432 gets the data object schema which should be returned to the application through the shared object access controller 426. The shared object access controller 426 queries the trade permission, gets the attribute list that can be accessed by the application. The shared object access controller calls a shared data format validator 428 to validate the attribute list and the data format. If the requesting application requires any specific data format, the shared data format validator handles the data format transformation. The shared object access controller 426 returns the data object schema associated with the application to the attributes based query 432. The attributes based query 432 queries by request parameter and returns attribute list to SDM shared object DB 416. The SDM shared object DB 416 returns the data to the attributes based query, which in turn, returns the data to the app. An attribute based update 430 enables an app to "write" a value to an attribute in the Shared Object DB 416. The interaction of the attribute based update 430 with other components in the Shared Object Access Manager 422, the shared object access controller 426 and the shared data format validator 428 is similar to those of the attributes based query 432.

A mobile device of the present disclosure in one aspect may be a smart phone or like device and may include a computer or processing system, including computer system executable instructions, such as program modules, being executed by a computer system. Generally, program modules may include routines, programs, objects, components, logic, data structures, and so on that perform particular tasks or implement particular abstract data types. Parts of the computer system may be practiced in distributed cloud computing environments where tasks are performed by remote processing devices that are linked through a communications network. In a distributed cloud computing environment, program modules may be located in both local and remote computer system storage media including memory storage devices.

The components of mobile device may include, but are not limited to, one or more processors or processing units, a system memory, and a bus that couples various system components including system memory to processor. The processor may include one or more modules that perform the methods described herein. The modules may be programmed into the integrated circuits of the processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. Each can be connected to bus by one or more data media interfaces.

Computer system may also communicate with one or more devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. A network adapter may communicate with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of coordinating data sharing among applications in mobile devices, comprising:
    creating, by a processor, on a mobile device one or more shared data manager partitions;
    receiving from a plurality of mobile applications deployed on the mobile device, data trade requirements associated with said plurality of mobile applications, data trade requirements including requirements to read, or write or both read and write, of data managed by said one or more shared data manager partitions;
    receiving grants or denials of said requirements for each of said plurality of mobile applications;
    storing said grants or denials in a shared data manager operational database; and
    transmitting said grants or denials to said plurality of mobile applications, wherein the plurality of mobile applications are enabled to execute their functionalities using the data based on said grants or denials,
    wherein the steps of receiving data trade requirements, receiving grants or denials, storing and transmitting are performed by a shared data manager application deployed on the mobile device and running on one of said one or more shared data manager partitions,
    wherein the shared data manager application is a deployable mobile application separately deployable from an operating system of the mobile device,
    wherein the one or more shared data manager partitions includes a plurality of shared data manager partitions, each of the plurality of shared data manager partitions associated with a set of mobile applications deployed on the mobile device,
    wherein the plurality of shared data manager partitions on the mobile device are associated with a plurality of logical instances of the shared data manager application, respectively, and wherein the set of mobile applications associated with a same shared data manager partition share data among said set of mobile applications according to the data trade requirements associated with the set of mobile applications stored by said same shared data manager partition.

2. The method of claim 1, wherein a mobile application is associated with only one of the plurality of share data manager partitions.

3. The method of claim 1, wherein the plurality of mobile applications adapts their functionality based on said grants or denials.

4. The method of claim 1, wherein the shared data manager operational database is located remotely from the mobile device.

5. The method of claim 1, wherein the steps of receiving data trade requirements, receiving grants or denials, storing and transmitting are dynamically performed by a shared data manager application deployed on the mobile device as additional mobile applications are deployed on the mobile device.

6. A computer readable storage medium, excluding signal per se, storing a program of instructions executable by a machine to perform a method of coordinating data sharing among applications in mobile devices, comprising:

creating, by a processor, on a mobile device one or more shared data manager partitions;

receiving from a plurality of mobile applications deployed on the mobile device, data trade requirements associated with said plurality of mobile applications, data trade requirements including requirements to read, or write or both read and write, of data managed by said one or more shared data manager partitions;

receiving grants or denials of said requirements for each of said plurality of mobile applications;

storing said grants or denials in a shared data manager operational database; and transmitting said grants or denials to said plurality of mobile applications, wherein the plurality of mobile applications are enabled to execute their functionalities using the data based on said grants or denials, wherein the steps of receiving data trade requirements, receiving grants or denials, storing and transmitting are performed by a shared data manager application deployed on the mobile device and running on one of said one or more shared data manager partitions, wherein the shared data manager application is a deployable mobile application separately deployable from an operating system of the mobile device, wherein the one or more shared data manager partitions includes a plurality of shared data manager partitions, each of the plurality of shared data manager partitions associated with a set of mobile applications deployed on the mobile device, wherein the plurality of shared data manager partitions on the mobile device are associated with a plurality of logical instances of the shared data manager application, respectively, and wherein the set of mobile applications associated with a same shared data manager partition share data among said set of mobile applications according to the data trade requirements associated with the set of mobile applications stored by said same shared data manager partition.

7. The computer readable storage medium of claim 6, wherein a mobile application is associated with only one of the plurality of share data manager partitions.

8. The computer readable storage medium of claim 6, wherein the plurality of mobile applications adapts their functionality based on said grants or denials.

9. The computer readable storage medium of claim 6, wherein the shared data manager operational database is located remotely from the mobile device.

10. The computer readable storage medium of claim 6, wherein the steps of receiving data trade requirements, receiving grants or denials, storing and transmitting are dynamically performed by a shared data manager application deployed on the mobile device as additional mobile applications are deployed on the mobile device.

11. A system coordinating data sharing among applications in mobile devices, comprising:

a mobile device having a processor;

a shared data manager application deployed on the mobile device, the shared data manager including one or more shared data manager partitions;

a plurality of mobile applications deployed on the mobile device, each of the plurality of mobile applications providing to the shared data manager application, data trade requirements associated with said each of the plurality of mobile applications, data trade requirements including requirements to read, or write or both read and write, of data managed by said one or more shared data manager partitions, the shared data manager receiving grants or denials of said requirements for each of said plurality of mobile applications, the shared data manager further storing said grants or denials in a shared data manager operational database, and transmitting said grants or denials to said plurality of mobile applications, wherein the plurality of mobile applications are enabled to execute their functionalities using the data based on said grants or denials, wherein the shared data manager application is a deployable mobile application separately deployable from an operating system of the mobile device, wherein the one or more shared data manager partitions includes a plurality of shared data manager partitions, each of the plurality of shared data manager partitions associated with a set of mobile applications deployed on the mobile device, wherein the plurality of shared data manager partitions on the mobile device are associated with a plurality of logical instances of the shared data manager application, respectively, and wherein the set of mobile applications associated with a same shared data manager partition share data among said set of mobile applications according to the data trade requirements associated with the set of mobile applications stored by said same shared data manager partition.

12. The system of claim 11, wherein said each of the plurality of mobile applications registers with the shared manager application, for sharing of the data.

13. The system of claim 11, wherein said each of the plurality of mobile applications is associated with only one of the plurality of share data manager partitions.

14. The system of claim 11, wherein the plurality of mobile applications adapts their functionality based on said grants or denials.

15. The system of claim 11, wherein the shared data manager operational database is located remotely from the mobile device.

16. The system of claim 11, wherein the shared data manager application receives the data trade requirements, receives the grants or denials, stores and transmit the grants or denials dynamically as additional mobile applications are deployed on the mobile device.

17. The system of claim 11, wherein the shared data manager application further includes a shared data editor that enables a user to view the data managed by the shared data manager, and grant or deny said data trade requirements associated with the plurality of mobile applications.

\* \* \* \* \*